United States Patent [19]

Kuroda

[11] Patent Number: 4,639,608
[45] Date of Patent: Jan. 27, 1987

[54] IMAGE READ-OUT APPARATUS WITH LIGHT SOURCE DRIVING MEANS

[75] Inventor: Yasuo Kuroda, Sagamihara, Japan

[73] Assignee: Canon Kabushiki Kaisha, Tokyo, Japan

[21] Appl. No.: 609,197

[22] Filed: May 11, 1984

[30] Foreign Application Priority Data

May 18, 1983 [JP] Japan .................................. 58-85891
Jun. 1, 1983 [JP] Japan .................................. 58-95680

[51] Int. Cl.$^4$ .......................... H01J 40/14; H04N 1/10
[52] U.S. Cl. .................................... 250/578; 358/293; 358/294
[58] Field of Search ................ 250/578, 563, 560; 358/293, 294, 290, 285, 286

[56] References Cited

U.S. PATENT DOCUMENTS

| | | | |
|---|---|---|---|
| 3,835,332 | 9/1974 | Bridges | 250/563 |
| 4,162,126 | 7/1979 | Nakagawa et al. | 356/237 |
| 4,317,137 | 2/1982 | Tompkins | 358/286 |

FOREIGN PATENT DOCUMENTS

| | | | |
|---|---|---|---|
| 58-114665 | 7/1983 | Japan | 250/294 |
| 58-114666 | 7/1983 | Japan | 250/294 |
| 58-114667 | 7/1983 | Japan | 250/294 |

Primary Examiner—David C. Nelms
Assistant Examiner—Michael Messinger
Attorney, Agent, or Firm—Fitzpatrick, Cella, Harper & Scinto

[57] ABSTRACT

In the case where a plurality of photo sensing elements are arranged in a line to form a linear sensor and picture images are sequentially read out by the photo sensing elements, the uniform illumination is performed by lighting both the light source corresponding to the photo sensing element which is reading and at least one of the light sources adjacent to that light source, thereby obtaining an output signal with less read-out distortion. A plurality of light sources arranged respectively in correspondence with the plurality of photo sensing elements are sequentially turned on by a plurality of blocks at a time and are scanned, thereby providing uniform illumination and suppressing an amount of heat generation in the light sources when they are lit, so that deterioration in the characteristics of the light sources is prevented. In addition, the light source and power source sections are miniaturized, thereby realizing a decrease in size and weight of the whole apparatus.

14 Claims, 16 Drawing Figures

FIG. 4A SENSE TIMING

FIG. 4B LIGHT SOURCE BLOCK D2

FIG. 4C LIGHT SOURCE BLOCK D3

FIG. 4D LIGHT SOURCE BLOCK D4

FIG. 4E LIGHT SOURCE BLOCK D5

IMAGE READ-OUT APPARATUS WITH LIGHT SOURCE DRIVING MEANS

BACKGROUND OF THE INVENTION

1. Field of the Invention

The present invention relates to an image read-out apparatus for reading out image information by illuminating an original.

2. Description of the Prior Art

Conventionally, photo reaction type sensors made of amorphous silicon material have been used. The sensor made of such material exhibits a change in resistance responsive to the intensity of the light emitted onto the sensor. Therefore, by constituting a circuit so that this resistance change is detected using an electrical circuit, the intensity of the light to be emitted onto the sensor can be output as an electrical signal.

However, this type of sensor has the problem that, when the light is emitted thereon, its sensitive characteristic gradually deteriorates in proportion to the time it is subjected to the light emission. Consequently, there is the problem that if the light is continuously emitted onto all sensors while the signals of the sensors are being read out, it will cause deterioration in the sensitivity of the sensors and will result in a loss of their function as sensors for a short time.

To solve this problem, conventionally, a method whereby the time period whent he light is emitted to the sensor is minimized as needed thereby to prevent deterioration sensitivity of the sensor, has been generally used.

A constitution of a conventional sensor and a light source section will be described hereinbelow with reference to drawings.

Figure 1:
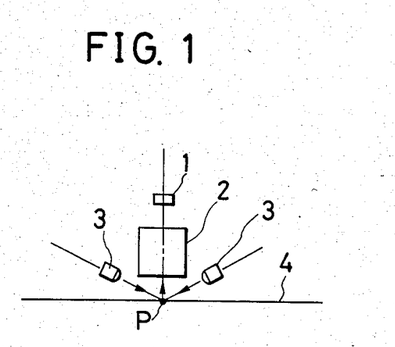
FIG. 1 is a diagrammatical view showing a constitution of a sensor and a light source of an image read-out apparatus.

FIG. 1 is a cross sectional view showing a constitution of a sensor and a light source section of an image read-out apparatus, in which a reference numeral 1 denotes a sensor made of amorphous silicon material. Light condensing material 2 serves to focus the light from a light source, 3 which may as shown comprise light source units on opposite sides of light condensing material 2 reflected from a read-out point P on an original 4 into the sensor 1.

Figure 2:
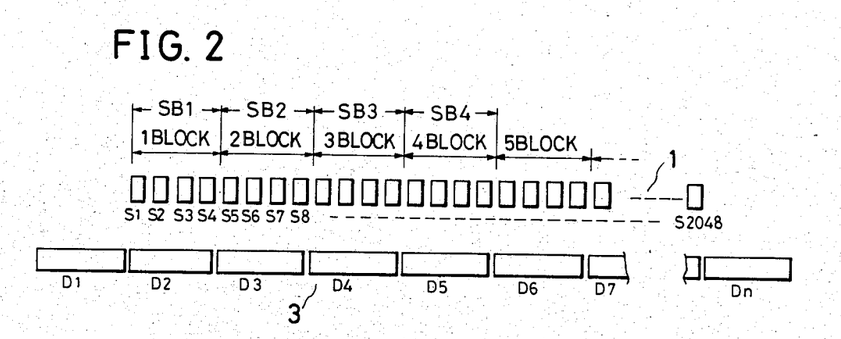
FIG. 2 is an explanatory view showing diagrammatically an arrangement of the sensor and light source of the image read-out apparatus in FIG. 1.

FIG. 2 diagrammatically illustrates an arrangement of the sensor and light source in FIG. 1, in which numerals 1 and 3 are common to those in FIG. 1. The sensor 1 is constituted by many blocks (SB1, SB2, . . .) each consisting of four sensor elements (S1–S4, S5–S8 . . .). The light source 3 is also constituted of many blocks represented by D1 through Dn (where n is a natural number). In this light source 3, the size of each block Di (where i is a natural number from 1 to n) is set to be substanitally equal to a size of one block of the sensor.

Conventiolly, in case of fetching the outputs of one block of the sensor, e.g., of the sensor elements S1 to S4, only the light source of block D2 was lit. With such a constitution, the time when the sensor is irradiated can be set into a factor of total number of blocks. Namely, the quantity of light to be emitted ot the sensor 1 can be minimized, thereby enabling deterioration in sensitivity of the sensor to be retarded by a corresponding amount.

Figure 3:
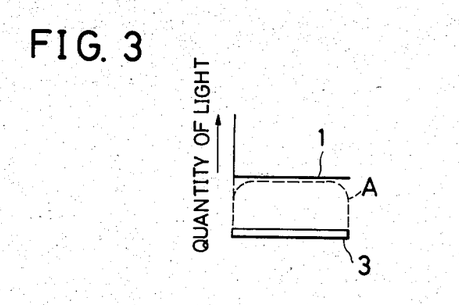
FIG. 3 shows a characteristic diagram of a distribution of a quantity of light which is emitted from the light source into the sensor block according to a conventional read-out method.

However, in this method, since the light source block and sensor block have the same size, the quantity of light ot be emitted to the sensor is lower at both ends of each sensor block than in the middle, as shown in a curve A in FIG. 3, so that there are drawbacks such as that this causes the sensor output to be distorted and an appropriate signal cannot be obtained and, accordingly, it is necessary to correct the signal by providing a distortion correction circuit or the like, resulting in the complication fo the signal fetching circuit.

On the other hand, there is known an image read-out sensor which is constituted by an array of optical sensors such as CCDs (charge coupled devices) arranged fully in the location corresponding to a whole width of an original in the facsimile apparatus or an apparatus for entering characters, picture, etc. Such a read-out sensor together with a light source arranged similarly along the width of original constitutes an image read-out apparatus and serves to read out a picture on the original by means of the light read out a picture on the original by means of the light from the light source to be reflected through the original. In recent years, there has been frequently used an arrangement wherein a number of LEDs used as the light source are arranged in a line near the read-out sensor for the purpsoes of miniaturization and decrease in weight of the apparatus.

In the case of such a light source using LEDs, in many cases, the ligth source is arranged so as to exceed the original width to compensate for a decrease in the quantity of light at both end portions of the original. For examle, in the case of an original size of A4 (210 mm in width), the light source is arranged soa s to extend an additional 10 mm or so, at both ends beyond the arrangement width of the read-out sensor which is equal to the width of the original. Thus, the whole length of the light source made up of the LEDs is about 230 mm. In this case, if the arrangement pitch of the LEDs is set to be so small as about 1.25 mm to prevent deterioration in light quantity distribution characteristic due to variation in the quantity output by light of each LED, a total of 184 LEDs will be needed. When it is now assumed that electric power consumption per LED is 40 mW, then when all LEDs are lit, heat generation of total 7 W or more would be produced.

In general, as for LEDs, denoting the luminous intensity at an ambient temperature of 25° C. by 1, the luminous intensity at 50° C. is about 20%. Furthermore, a quantity of light to be emitted from the LED also deteriorates even due to the heat generation of the LED itself. Therefore, radiation fins are ordinarily attached to the light source using LEDs of this kind to suppress the influence of the heat. As a result, the size of a light source section inevitably becomes large, causes a problem regarding miniaturization and decrease in the weight of the apparatus.

In consideration of the above drawbacks, light source control as shown in FIGS. 4A–4E is often performed in the conventional apparatus.

Figure 4A:
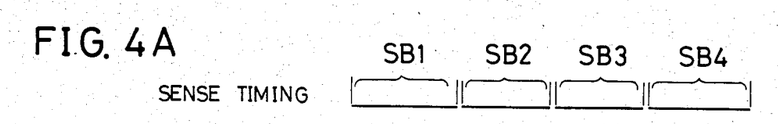
FIGS. 4A to 4E show timing charts to describe the image read-out and light source control operations in a conventional image read-out apparatus.
Figure 4B:
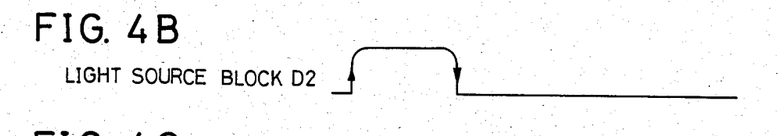
Figure 4C:
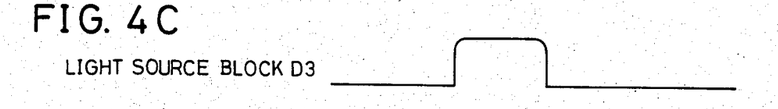
Figure 4D:
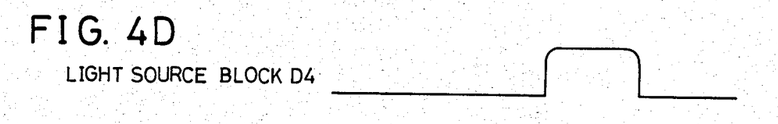
Figure 4E:
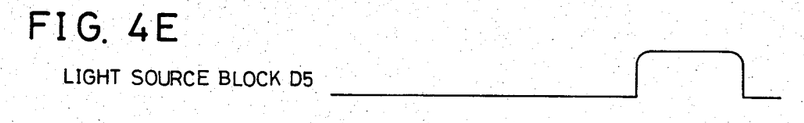

The photo sensor 1 and light source 3 are controlled with timings as shown in FIGS. 4A–4E. As shown in FIG. 4A, the blocks SB1 to SB4 of the photo sensor 1 are sequentially enabled one by one and each light source block D2 to D5 is also sequentially lit and controlled synchronously with this. (However, although each sensor block SB1–SB4 is strobed for every block, each photo sensor element in a block is sequentially enabled.)

While the amount of heat generation in the light source can be advantageously suppressed by performing such light-on control, there are drawbacks such as tht the quantity of light is lower at both end portions of each block, which occurs at both end portions of the light source in the case of simultaneously lighting all of the light sources, and that an error will be easily caused when the signal read out by the photo sensor 1 is subjected to binary-code processing at the post stage.

SUMMARY OF THE INVENTION

It is a first object of the present inentio to reduce distortion in a read-out signal by adding uniform light quantity distribution to the whole block surface of photo sensor elements.

A second object of the invention is to suppress an amount of heat generation in a light source and thereby to prevent deterioration in characteristic of the light source.

A third object of the invention is to miniaturize the light source by making radiation fins and the like unnecessary and further to miniaturize a power source section by making a capacity of the power source small thereby realizing decrease in size and weight of the whole apparatus.

BRIEF DESCRIPTION OF THE DRAWINGS

FIGS. 5, 6 and 7A-7C are diagrams to explain a first embodiment of the present inention, in which

DETAILED DESCRIPTION OF THE INVENTION

Figure 5:
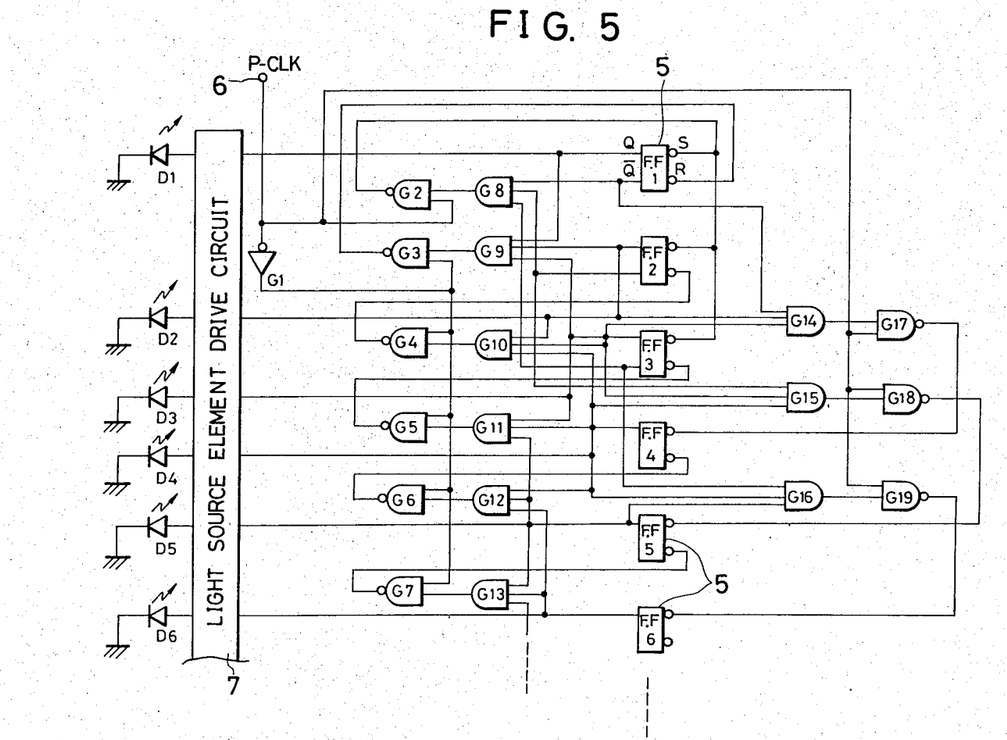
FIG. 5 is a diagram showing a circuit for generating a drive signal to drive the light source.
Figure 6:
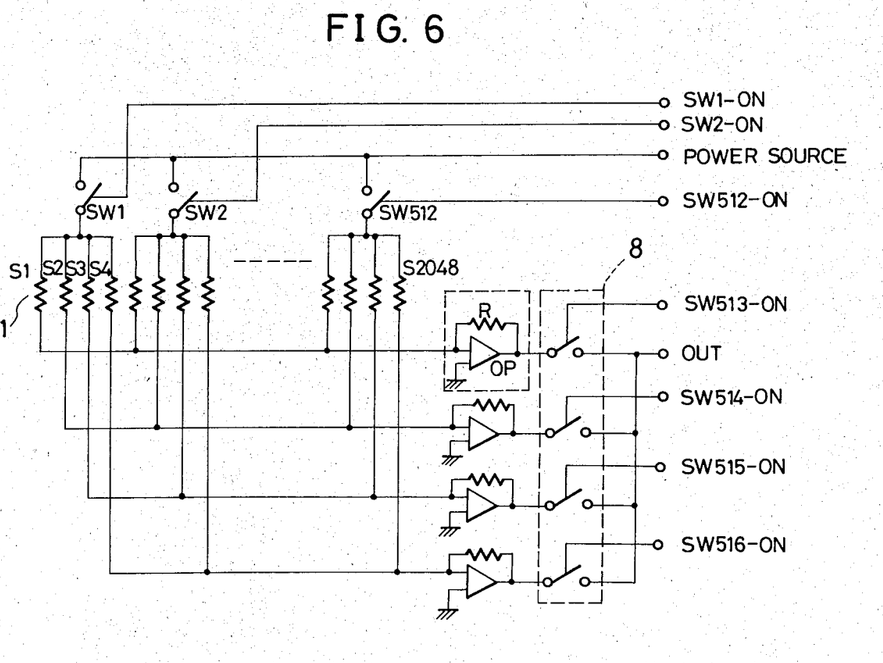
FIG. 6 is a diagram showing a sensor signal fetching circuit.

FIGS. 5 and 6 are diagrams to describe a first embodiment of the present invention, in which FIG. 5 shows a circuit for generating a drive signal for the light source and FIG. 6 shows a circuit for fetching a sensor signal. The operations of the circuits shown in FIGS. 5 and 6 will be described hereinbelow using timing waveforms shown in FIGS. 7A and 7B.

Figure 7A:
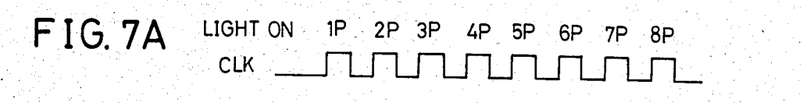
FIG. 7A shows a waveform diagram of a light source light-on clock signal which is input ot the drive signal generating circuit for the light source of FIG. 5.

In FIG. 5, a reference numeral 5 denotes flip flops (F.F), in which S indicates a set terminal, R is a reset terminal, and Q and $\overline{Q}$ are output terminals, respectively. This drive signal generating circuit for the ligth source is constituted in the manner such that when a clock (CLE) waveform shown in FIG. 7A is input from an input terminal 6, flip flops F.F1 to F.F3 are set in response to the leading edge of 1P-CLK and the output terminal Q becomes "1", and that the light sources D1 to D3 are lit on by a light source element drive circuit 7.

Figure 7B:
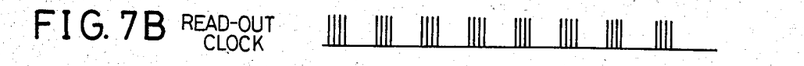
FIG. 7B shows a waveform diagram of a read-out clock signal which is input to the sensor signal fetching circuit of FIG. 6.

At the same time, switches 8 (SW513-SW516) of the sensor signal fetching circuit shown in FIG. 6 are made opeative at timings of read-out clocks shown in FIG. 7B, thereby fetching the signals. This read-out operation is performed when the clock waveform is "1".

In addition, in the sensor signal fetching circuit shown in FIG. 6, the signals are read out from the matrix constitution.

Then, the F.F1 of the flip flop 5 shwon in FIG. 5 is reset in response to the trailing edge of 1P-CLK. The output Q of the F.F4 is set to "1" in response to the leading edge of 2P-CK provided that (1) the output Q of the F.F1 is "0" and (2) the output Q of the F.F2 is "1" and (3) the output Q of the F.F3 is "1", so that the light sources of D2, D3 and D4 are turned on.

At this time, the drive signal generating circuit for the light source shown in FIG. 6 reads out the sensor outputs of S5 to S8 at the timings of the read-out clock shown in FIG. 7B similarly to the manner mentioned before.

Figure 7C:
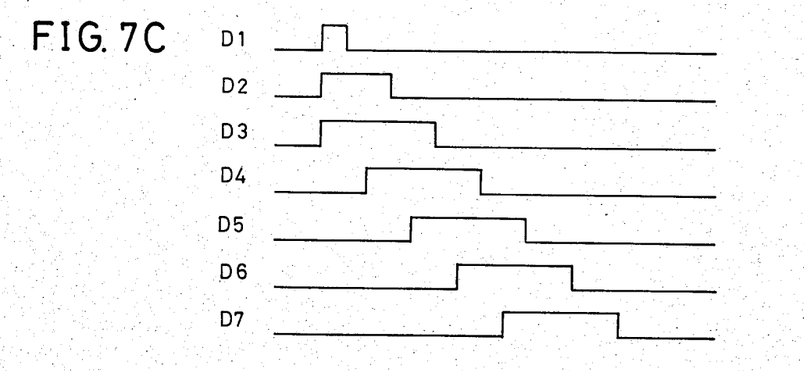
FIG. 7C shows a waveform diagram to explain the operation timings of the drive signal generating circuit for the light source in FIG. 5 based on the light source light-on clock waveforms shown in FIG. 7A.

The similar operations are subsequently repeated and the light sources of D1 to D7 are turned on as shown in FIG. 7C, so that the outputs of all sensors can be fetched.

Figure 8:
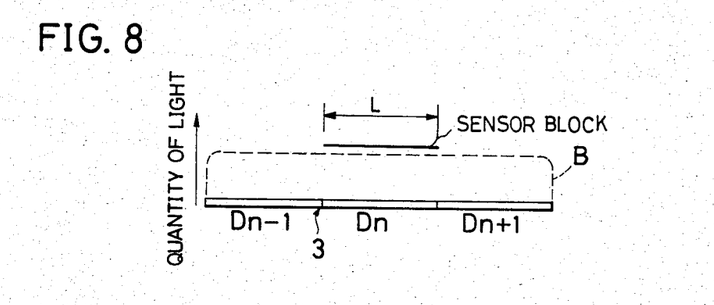
FIG. 8 is a characteristic diagram showing a distribution of a quantity of light which is emitted into the sensor block according to a light source lighting method of the present inventio.

The present embodiment is constituted as described above, and by lighting one sensor block and the light source block which faces this sensor block and the light source blocks at both ends thereof as shown by a curve B in FIG. 8, it is possible to obtain a uniform light quantity distribution over the whole surface of the sensor block. Therefore, an effect such that the correction circuit which has been conventionally used can be removed is obtained.

In addition, as another embodiment of the invention, a light emitting element such as an LED may be used as the light source.

In this case, since the heat generation in the element can be minimized, deterioration in sensitivity of the sensor due to the heat generation in the light source can also be minimized.

As is obvious from the above description, according to the present inention, by lighting the light source which faces the sensor block which is to be read out at a given time and the light sources of the blocks at bothe ends thereof, the sensor block to be read out can be substantially uniformly illuminated, so that it is possible to remove the circuit for correcting for the lack of light at both ends of the sensor that has been conventionally used. Therefore, this allows the sensor signal fetching circuit to be remarkably simplified and a remarkable decrease in cost is realized.

In addition, since the light is emitted to the sensor for only the minimum time period during the read-out cycle, there is also the effect that deterioration in sensitivity of the sensor can be delayed longer.

Figure 9:
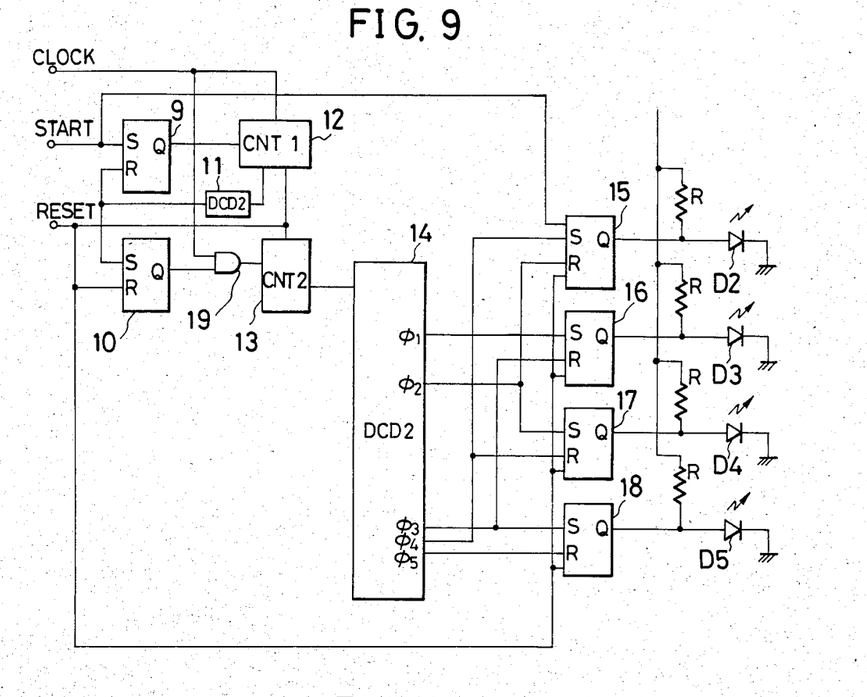
FIG. 9 is a block diagram showing a constitution of a light source control unit in an image read-out apparatus of a second embodiment of the inentin.

FIG. 9 shows a constitution of a second embodiment of the light source control unit which is used in the present invention. The image read-out apparatus for use ina facsimile apparatus and the like will be described hereinbelow as the embodiment.

In FIG. 9, reference numerals 9, 10, and 15 to 18 indicate RS flip flops each of which is constituted by a flip flop element or a combination of gate elements. As shown in the diagram, flip flops 15–18 each having a plurality of set or reset input terminals are used.

This circuit has three input terminals indicated by reference characters CLOCK, START and RESET and a clock pulse is input to a counter 12 and an AND gate 19 from the input terminal CLOCK.

On one hand, a reset pulse for allowing the new light source control to be started from the beginning is inut from the input terminal RESET. Counters 12 and 13 and flip flops 15–18 are reset in response to this reset pulse, so that the respective light source blocks D2–D5 are reset into the light-off state.

A set pulse for allowing the light source control to be started is input from the input terminal START to set terminals of the flip flops 9 and 15. An output of the flip flop 9 is input to the counter 12, thereby setting the counter 12 into the count enable state. When the counter 12 counts a predetermined number of clock pulses, the flip flop 9 is reset and the flip flop 10 is set through a decoder 11 in response to an output of the counter 12.

When this flip flop 10 is set, the AND gate 19 opens, thereby allowing the counter 13 to start the counting of the clock pulse. The decoder 14 is controlled based on the counting of a predetermined value by this counter 12, and the flip flops 15 to 18 are set and reset in response to five outputs of a decoder 14 in accordance with the count number of the counter 13.

Namely, the flip flop 16 is set in response to an output ∅1 of the decoder 14 and the flip flop 15 is reset and the flip flop 17 is set in response to an output ∅2. In addition, the flip flop 16 is reset and the flip flop 18 is set responsive to an output ∅3. The flip flop 15 is set and the flip flop 17 is reset in response to an output ∅4. Furthermore, the flip flop 18 is reset responsive to an output ∅5.

The light source blocks D2 to D5 using LEDs are respectively connected betwen the ground and the output terminal of each of the flip flops 15–18, while a voltage between each output terminal and the light source block is pulled up to a power source voltage +V through a resistor R. In this case, it is assumed that each light source block D2–D5 is arranged for the photo sensor 1 in the similar manner as the conventional example as shown in FIG. 2 as mentioned before.

The operations in the above mentioned constitution will then be described in detail with reference to FIG. 10, which shows a timing chart for the light-on control which is similar to FIG. 4.

Firstly, in the case of newly starting the light source control, a reset pulse is inut from the input terminal RESET to reset each flip flop and counters 12 and 13.

Then, a start pulse is input from the input terminal START to set the flip flops 9 and 15. Thus, the counter 12 is set into the count enable state, allowing the light source block D2 to be turned on.

Figure 10:
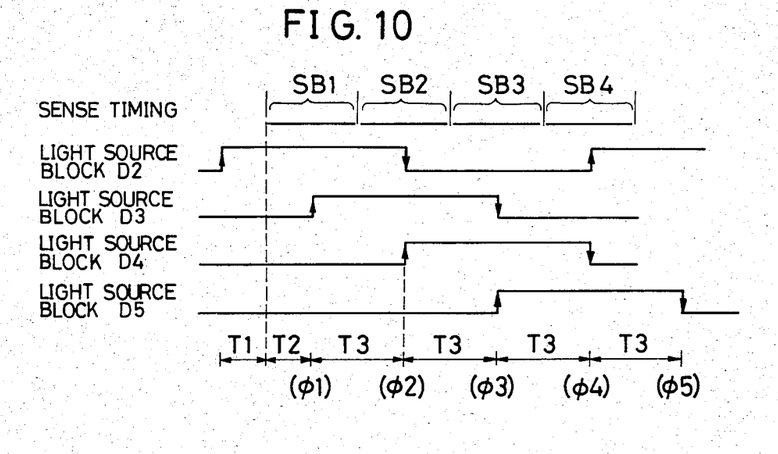
FIG. 10 shows a timing chart to explain the image read-out and light source light-on timings in the image read-out apparatus of the second embodiment of the invention.

When the counter 12 counts the clock pulse equal to a time T1 shown in a timing chart of FIG. 10, i.e., to the time until the sense timing of the sensor block 1, it resets the flip flop 9 and set the flip flop 10 through the decoder 11, respectively. The AND gate 19 opens in association with the setting of this flip flop 10, thereby allowing the counter 13 to start the counting of the clock pulse.

When the counter 13 counts the clock pulse equal to a time T2 of FIG. 10, the decoder 14 sets the flip flop 16 by the output ∅1, thereby causing the light source block D3 to be turned on. It is preferable to set the light-on timing of this light source block D3 into the time point when the original scanning location reaches the intermediate point of the sensor block SB1 as shown in FIG. 10. Due to this, it is possible to individually control the left half region and right half region based on the intermediate point as a center.

Subsequently, when the counter 13 counts the clock pulse equal to a time T3 from the light-on of the light source block D3, i.e., to the time when the scanning location reaches the central position of the subsequent sensor block SB2, the decoder 14 resets the flip flop 15 and sets the flip flop 17 by the output ∅2. Due to this, the light source block D2 is turned off and the light source block D4 is turned on. At this time, the light source block D3 is continuously lit since the flip flop 16 is held set.

Then, when the counter 13 counts the clock pulse corresponding to the same time T3, the decoder 14 resets the flip flop 16 and sets the flip flop 18 by the output ∅3. Due to this, the light source block D3 is turned off and the light source block D5 is turned on while the light source block D4 remains lit.

Subsequently, when the counter 13 counts the clock pulse responsive to the time T3 similarly, the flip flop 17 is now reset and the flip flop 15 is set in response to the output ∅4 of the decoder 14. Thus, the light source block D4 is turned off and the light source block D2 is turned on while the light source block D5 is lit.

Furthermore, when the counter 13 counts the clock pulse corresponding to the time T3, the flip flop 18 is reset in response to the output ∅5 of the decoder 14, thereby cuasing the light source block D5 to be turned off. Subsequently, when the counting of the time T3 is performed, the decoder 14 sequentially outputs from the output ∅1, so that the light source blocks are controlled for every block in the manner as described above.

In this way, according to the foregoing embodiment, the adjacent light source blocks ont he side near the scanning location are controlled so that they are reliably lit when scanning. Therefore, a lack of light at the end portions of the light source block as in the conventioal arrangement does not occur. In addition, it is possible to remarkably reduce the amount of heat generation as compared with the method of simultaneously lighting all ight sources, and also to diminish the electric power consumption. In the above description, the light source and photo sensor are divided into four blocks, respectively, for the purposes of convenience and simplicity, and the half blocks thereof are reliably lit. Therefore, the electric power consumption and the amount of heat generation are merely one half of those of the all light source light-on method. However, if the light source is divided into a greater number of blocks, the heat generation and electric power consumption can be further reduced, so that this prevents deterioration of the elements such as LEDs which are used as the light source, and a decrease in light emission. At the same time, it is possibel to omit the heat radiating means which has been conventionally provided, thereby enabling the light source section and power source section to be decreased in size. Consequently, the invention is useful for miniaturizing the entire apparatus in which the light source and power source sections are adopted.

As is obvious from the above description, according to the present inention, in animage readout apparatus having means for illuminating a picture image by sequentially lighting a plurality of light sources arranged adjacently to read out the image, there is provided control means for holding the light-on of one light source adjacent to the light source when each light source is lit on. Therefore, it is possible to provide an excellent image read-out apparatus which can reduce the amount of heat generation of the light source and prevent deterioration in characteristics of the light emitting elements, and can realize the reduction in size and weight of the whole apparatus in which the light source section, power source section and the like are used.

What I claim is:

1. An image read-out apparatus comprising:
   light source means for exposing an original document, said light source means comprising a plurality of light source blocks which are arranged for exposign a line of image, each said light source block being able to be turned on individually;
   image sensor means for reading an image of the original document based on light from the original document exposed by means of said light source means; and
   driving means for driving said light source means so as to turn on said light source blocks sequentially, said driving means being operable to cause adjacent light source blocks to be turned on during a predetermined time period on an overlap basis.

2. An apparatus according to claim 1, wherein said driving emans is operable to drive said light source means in conjunction with the image reading operation of said image sensor means.

3. An apparatus according to claim 2, wherein said driving means is operable to drive said light source means based on clock signals associated with the image reading operation of said image sensor means.

4. An apparatus according to claim 1, wherein said image sensor means comprises a plurality of sensor elements arranged on a line configuration basis.

5. An apparatus according to claim 1, wherein said light source means comprises a plurality of LEDs.

6. An apparatus according to claim 1, wherein said driving means is operable to cause a lgith source block to be turned on and to remain turned on after the successive light source lbock is turned on by said driving means.

7. An apparatus according to claim 1, wherein said driving means is operable to cause a light source block to be turned on before a previously-turned-on light source block is turned off.

8. An apparatus according to claim 1, further comprising means for obtaining an image signal representing the image read by said image sensor means in cynchronism with the turning on operation of said plurality of light source blocks.

9. An image read-out apparatus comprising:
   light source means for exposing an original document, said light source means comprising a plurality of light source blocks arranged for exposing a line of image, each said light source block being able to be turned on individually;
   image sensor means for reading an image of the original document based on light from the original document exposed by means of said light source means, said image sensor means comprising a plurality of image sensor blocks arranged for reading a line of image exposed by means of said light source means on a share basis; and
   driving means for driving said light source means so as to turn on said light source blocks sequentially, said driving means being operable to turn on a light source block associated with one of said image sensor blocks in reading operation and, in addition, at least one of said light source blocks adjacent to said associated light source block, in such a manner that said associated light source block and said adjacent light source block are both on simultaneously for a predetermined time period.

10. An apparatus according to claim 9, wherein said driving means is operable to turn on selectively either one of said light source blocks adjacent to said associated light source block in conjunction with the image reading operation of said image sensor means.

11. An apparatus according to claim 9, further comprising read control means for causing said plurality of image sensor blocks to perform the reading operation in conjunction with the turn-on opeation of said plurality of light source blocks.

12. An apparatus according to claim 9, wherein each of said image sensor blocks comprises plurality of sensor elements.

13. An apparatus according to claim 9, wherein said light source means comprises a plurality of LEDs.

14. An apparatus according to claim 9, further comprising means for obtaining an image signal representing the image read by said plurality of image sensor blocks in synchronism with the turning on operation of said plurality of light source blocks.

* * * * *